Jan. 13, 1959 D. T. CORBIN 2,868,052
TIRE CHAIN APPLYING TOOL WITH POSITION SIGNALING MEANS
Filed Aug. 3, 1955
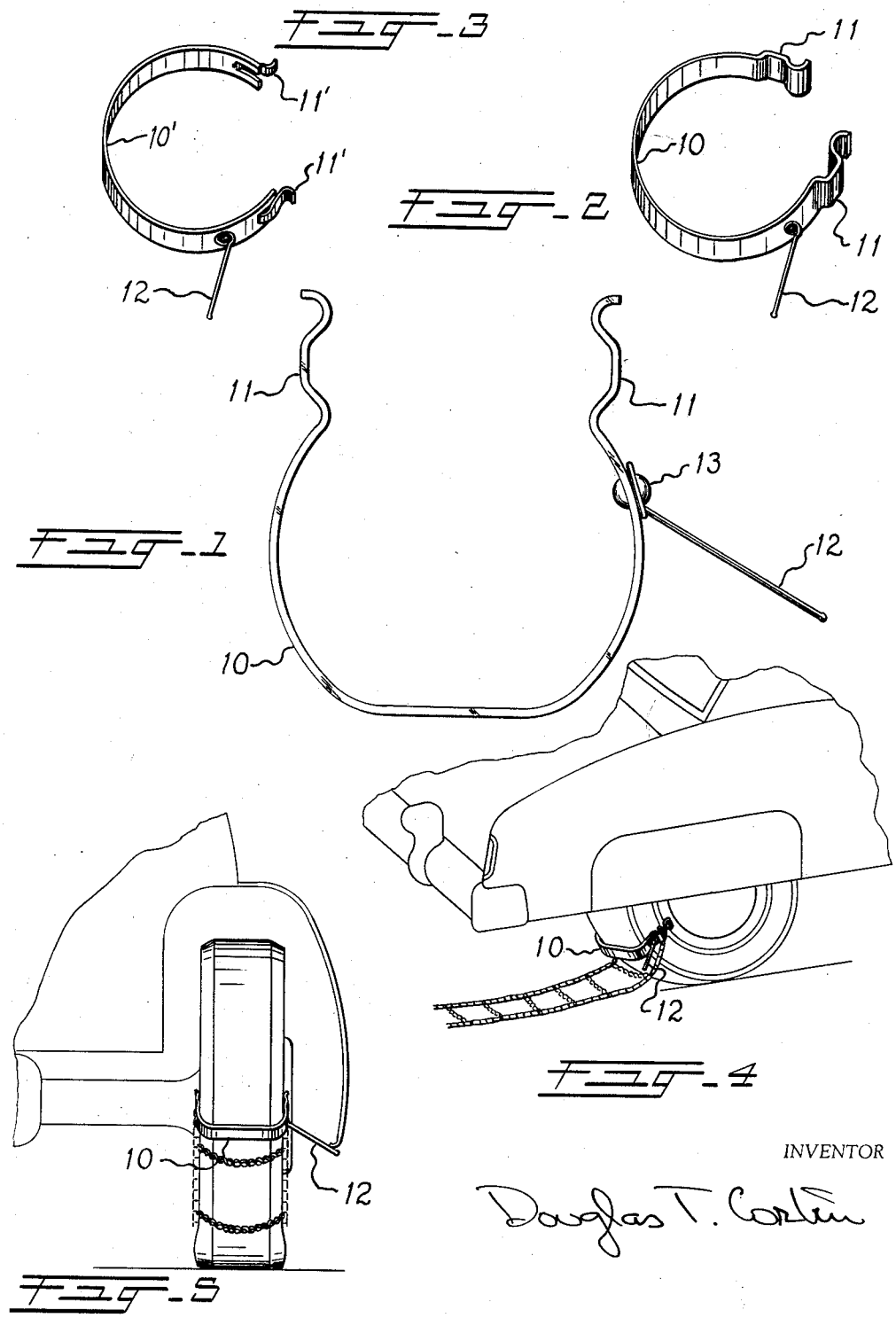
INVENTOR
Douglas T. Corbin

# 2,868,052

TIRE CHAIN APPLYING TOOL WITH POSITION SIGNALING MEANS

Douglas T. Corbin, Washington, D. C.

Application August 3, 1955, Serial No. 526,235

1 Claim. (Cl. 81—15.8)

This invention relates in general to a tool for use in applying anti-skid chains to wheels of motor vehicles. More particularly, the invention relates to a device which facilitates the mounting of a chain on a tire by gripping the chain ends and holding them in position on the vehicle wheels and also signals the driver within the car when the tool is in such a position relative to the auto fender that it may be most easily detached from chain and wheel.

The modern automobile has only a portion of the rear tire exposed due to the low overhang of the fender. Where fender skirts are used, only a small fraction of the tire appears at any given time. Consequently, it is virtually impossible to mount chains on modern autos without removing the fender skirts, if any, and employing a bumper jack to expose each entire rear wheel. Bumper jacks are notoriously unreliable—especially on snow or ice—so that their use where someone kneels or lies next to or beneath the fender and wheel is not recommended.

Accordingly, it is an object of this invention to provide a tool which facilitates the application of anti-skid chains to vehicles.

It is another object of this invention to provide a device for facilitating the application of chains to vehicle wheels which automatically signals the vehicle operator when the chain is properly wrapped about the wheel and when the tool is visible and in a position to be easily removed.

Further objects of this invention, if not specifically set out, will become apparent during the course of the following detailed description of the invention.

In the drawings:

Figure 1 is a side elevational view of the chain applying tool of this invention.

Figure 2 is an isometric view of the preferred embodiment.

Figure 3 is an isometric view of an alternative embodiment of the invention.

Figure 4 is a fragmentary view of a vehicle showing the manner of use of the chain applying tool of the invention.

Figure 5 is a fragmentary view of a vehicle taken from the inside of a rear fender showing the manner in which the signaling portion of the apparatus contacts with the interior of the auto fender.

Broadly, this invention comprises a generally U-shaped resilient spring member constructed of round or flat stock. The tool is of sufficient resilience that the arms are capable of firmly gripping a tire casing and holding in place adjacent thereto the ends of an anti-skid chain throughout the period of one wheel revolution. Alternatively, suitable hooks or other means may be provided at the extremities of the resilient arms for gripping the chain links. Approximately half way between the end of one arm and the base or cross-piece which is more or less perpendicular to the arms is placed a flexible and resilient wire antenna which extends outwardly from the tire when the tool is in use. This antenna is of such a length that it lightly scrapes against the interior of an auto fender as the wheel turns. In this manner, the vehicle operator can always determine, without getting out of the car to check, whether the chain applying tool is visible and removable, or whether it is hidden beneath the fender or fender skirt.

Referring now to the drawings, in which like characters refer to like parts throughout, the tool comprises a generally U-shaped resilient plate 10 preferably having outwardly extending stamped irregularities 11 (see Figure 2) at the extreme ends of plate arms of such a size as to receive the end links of the tire chain. In the embodiment 10' of Figure 3, the stamped out link holders are replaced with clips 11' beneath which chain links may be placed. This type of clip may be bowed as shown so as to grip the chain link or may simply extend upwardly so as to provide a hook over which the end link is placed.

Extending outwardly from one arm of plate 10, preferably at an acute angle, is an antenna 12 secured to the plate arm by means of bolt or rivet 13. Preferably, the antenna 12 extends from the outer end of an open coil spring diagonally downwardly. The antenna is of resilient metal construction resembling the curb signaling antennas which are mounted on auto fenders to aid in avoiding contact of white wall tires with curbing. However, the antenna used on the tool of this invention should be only long enough to lightly contact the inside of a low hanging vehicle fender when the tool is mounted on a tire and the wheel revolved.

In operation, the U-shaped resilient plate 10 is snapped over the vehicle tire with the antenna extending outwardly. End links of the chain to be applied are either slipped over the hooks or gripped between the tire and plate—as shown in Figure 4. When the vehicle wheel is revolved, the antenna will begin to scrape against the inside of the fender—as shown in Figure 5.

If the auto is being driven in a forwardly direction, the scraping sound will cease after somewhat more than one-half revolution and begin again after somewhat less than another one-half revolution. Just as the scraping begins anew, the driver, knowing that the chain is now completely wrapped about the auto wheel, stops and backs up several inches to expose the tool for easy removal.

Alternatively, if the chain is applied by driving in a rearward direction, with the chain being stretched out on the ground behind the wheel, the driver must stop the vehicle's motion just as soon as the scraping of antenna on fender stops. At this point, the tire chain will be in place and the tool exposed beneath the overhanging fender.

It is seen that this invention provides a tire chain applying tool provided with a signalling element which makes it possible for a motorist to wrap tire chains about the rear wheels of his auto unassisted and with a minimum of difficulty. The device completes the job for him and signals when the work is completed.

Obviously, many modifications and variations of the invention as hereinbefore set forth may be made without departing from the spirit and scope thereof, and therefore only such limitations should be imposed as are indicated in the appended claim.

I claim:

An auto-skid chain applying tool for vehicles having low hanging fenders comprising: a single length of spring stock bent into a generally U-shape and including a transverse portion and side arms extending upwardly from the ends of said transverse portion, the free ends of said arms having means for gripping and firmly holding the end links of a tire chain when said tool is operatively positioned about a vehicle tire; and a flexible antenna fixedly secured to the intermediate portion of the outermost of said tool arms and extending outwardly therefrom, said antenna being of sufficient length to gently contact and scrape against said fender whereby to signal the position of the said tool relative to said fender.

References Cited in the file of this patent

UNITED STATES PATENTS

| | | |
|---|---|---|
| 1,266,507 | Ludwig | May 14, 1918 |
| 1,668,821 | Rice | May 8, 1928 |
| 2,281,806 | Schulman | May 5, 1942 |
| 2,333,877 | Murphy et al. | Nov. 9, 1943 |

FOREIGN PATENTS

| | | |
|---|---|---|
| 123,396 | Sweden | Nov. 23, 1948 |